United States Patent
Yuan et al.

(10) Patent No.: US 11,307,151 B2
(45) Date of Patent: Apr. 19, 2022

(54) METHOD FOR DETECTING WAFER BACKSIDE DEFECT

(71) Applicant: Shanghai Huali Integrated Circuit Corporation, Shanghai (CN)

(72) Inventors: Zengyi Yuan, Shanghai (CN); Yin Long, Shanghai (CN); Kai Wang, Shanghai (CN)

(73) Assignee: Shanghai Huali Integrated Circuit Corporation, Shanghai (CN)

( * ) Notice: Subject to any disclaimer, the term of this patent is extended or adjusted under 35 U.S.C. 154(b) by 71 days.

(21) Appl. No.: 16/890,601

(22) Filed: Jun. 2, 2020

(65) Prior Publication Data

US 2021/0063320 A1    Mar. 4, 2021

(30) Foreign Application Priority Data

Aug. 29, 2019   (CN) .......................... 201910809001.3

(51) Int. Cl.
*G01N 21/95* (2006.01)
*G01N 21/88* (2006.01)

(52) U.S. Cl.
CPC ... *G01N 21/9505* (2013.01); *G01N 2021/887* (2013.01); *G01N 2021/8861* (2013.01)

(58) Field of Classification Search
CPC ............. G01N 21/956; G01N 21/9501; G01N 2021/213; G01N 21/4788; G01N 21/55;
(Continued)

(56) References Cited

U.S. PATENT DOCUMENTS 6,445,199 B1 * 9/2002 Satya .................... G01N 21/66
                                                          324/754.21
7,092,082 B1 * 8/2006 Dardzinski ........ G01N 21/9501
                                                          250/201.3
(Continued)

FOREIGN PATENT DOCUMENTS

CN         101711354 A      5/2010
CN         103295930 A      9/2013
(Continued)

OTHER PUBLICATIONS

Jun. 7, 2021—CN—CNIPA First Search Report Appn 201910809001.3.

*Primary Examiner* — Michael P Stafira
(74) *Attorney, Agent, or Firm* — Banner & Witcoff, Ltd.

(57) ABSTRACT

The present disclosure discloses a method for detecting a wafer backside defect, comprising: Step 1, providing a signal database comprising signal data corresponding to various different defects, the defects comprising convex defects and concave defects, the signal data reflecting 3D information of the corresponding defect; Step 2, performing backside scanning on a tested wafer by using oblique incident light, and collecting corresponding emitted and scattered light data; and Step 3, comparing the collected emitted and scattered light data with the signal data, and fitting a defect 3D distribution map of the backside of the tested wafer. The present disclosure can test the height or depth of a wafer backside defect and form a 3D distribution map of the wafer backside defect, which is beneficial for analyzing the source of the wafer backside defect and processing it in time, reducing the troubleshooting time and improving the product yield.

14 Claims, 4 Drawing Sheets

(58) Field of Classification Search
CPC ....... G01N 2015/1006; G01N 33/5094; G01N 2015/008; G01N 1/34; G01N 15/1404; G01N 2015/1493; G01N 21/21; G01N 2333/70596; G01N 21/211; G01N 21/95607; G01N 33/5029; G01N 21/9505; G01N 33/5005; G01N 33/5008; G01N 33/54366; G01N 33/588; G01N 21/8851; G01N 33/54373; G01N 21/47; G01N 23/04; G01N 33/5308; G01N 33/54386; G01N 2021/95615; G01N 21/77; G01N 2201/12; G01N 2021/8883; G01N 21/8806; G01N 2223/6116; G01N 2223/6462; G01N 33/551; G01N 33/552; G01N 33/56927; G01N 2021/7779; G01N 2021/8838; G01N 21/4738; G01N 21/4785; G01N 21/6428; G01N 21/78; G01N 21/94; G01N 23/2251; G01N 33/56983; G01N 2021/0137; G01N 2021/8867; G01N 2021/8887; G01N 21/95692; G01N 2223/304; G01N 2223/401; G01N 2223/418; G01N 2223/646; G01N 23/201; G01N 1/2813; G01N 1/30; G01N 2021/1725; G01N 2021/558; G01N 2021/5957; G01N 2021/8861; G01N 2021/887; G01N 2021/95676; G01N 21/05; G01N 21/4133; G01N 21/553; G01N 21/88; G01N 21/95623; G01N 2333/11; G01N 2800/52; G01N 33/49; G01N 33/543; G01N 33/56911; G01N 33/56944; G01N 33/56988; G01N 35/00871; G01N 15/1484; G01N 2015/0073; G01N 2015/0084; G01N 2015/1486; G01N 2021/6439; G01N 2021/6482; G01N 2021/7793; G01N 2021/8848; G01N 2021/9513; G01N 2021/95638; G01N 2033/0095; G01N 2035/00495; G01N 2035/00881; G01N 2035/0434; G01N 21/00; G01N 21/01; G01N 21/45; G01N 21/474; G01N 21/6452; G01N 21/658; G01N 21/69; G01N 21/76; G01N 22/02; G01N 2201/0683; G01N 2223/61; G01N 23/083; G01N 23/203; G01N 23/2252; G01N 2333/135; G01N 2333/162; G01N 2333/22; G01N 2333/295; G01N 2333/315; G01N 33/00; G01N 33/487; G01N 33/526; G01N 33/53; G01N 33/547; G01N 33/56966; G01N 33/56972; G01N 33/6872; G01N 33/80; G01N 35/00029; G01N 35/1009; G01N 2021/8438; G01N 21/958; G01N 2021/8472; G01N 21/8422; G01N 21/95; G01N 27/902; G01N 2021/8825; G01N 21/33; G01N 17/00; G01N 2021/8854; G01N 2021/8864; G01N 25/72; G01N 27/9046; G01N 15/1434; G01N 15/1475; G01N 2015/1445; G01N 2021/0112; G01N 2021/8877; G01N 21/53; G01N 21/64; G01N 2291/0289; G01N 23/18; G01N 27/904; G01N 2021/4707; G01N 2021/4742; G01N 2021/8835; G01N 21/896; G01N 21/9515; G01N 21/954; G01N 2201/1085; G01N 2291/023; G01N 2291/0423; G01N 2291/2695; G01N 23/20; G01N 27/221; G01N 29/041; G01N 29/0654; G01N 29/069; G01N 29/36; G01N 29/4472; G01N 29/50; G01N 33/5091; G01N 33/57484

See application file for complete search history.

(56) References Cited

U.S. PATENT DOCUMENTS

| | | | | |
|---|---|---|---|---|
| 2007/0229809 | A1* | 10/2007 | Belyaev | G01N 21/9501 356/237.2 |
| 2013/0278926 | A1* | 10/2013 | Takahashi | G01N 21/9501 356/237.5 |
| 2018/0103247 | A1* | 4/2018 | Kolchin | H04N 13/254 |
| 2019/0162676 | A1* | 5/2019 | Cheng | G01N 21/9501 |

FOREIGN PATENT DOCUMENTS

| | | | |
|---|---|---|---|
| CN | 107275245 | A | 10/2017 |
| CN | 108351311 | A | 7/2018 |
| CN | 109425619 | A | 3/2019 |
| CN | 109791897 | A | 5/2019 |
| CN | 109979840 | A | 7/2019 |
| JP | 2001004552 | A | 1/2001 |
| TW | 546754 | B | 8/2003 |
| TW | 201819896 | A | 6/2018 |

* cited by examiner

METHOD FOR DETECTING WAFER BACKSIDE DEFECT

CROSS REFERENCE TO RELATED APPLICATIONS

The present application claims priority to and the benefit of Chinese Patent Application No. CN 201910809001.3 filed on Aug. 29, 2019, the disclosure of which is incorporated herein by reference in its entirety as part of the present application.

TECHNICAL FIELD

The present disclosure relates to a method for manufacturing a semiconductor integrated circuit, in particular to a method for detecting a wafer backside defect.

BACKGROUND

In the manufacturing process of semiconductor chips, with the decline of technology nodes, the requirement for forming a device is becoming more and more strict. The impact of a wafer backside defect (that is, a defect on a backside of a wafer) on a wafer frontside pattern is becoming increasingly serious. The detection of the wafer backside defect is getting increasingly significant. The contact part of the process tool in contact with the backside of the wafer will also leave imprints on the wafer backside. These imprints may form particular pattern residues as the subsequent processes progress, affecting the normal progress of subsequent photolithography process. For example, when a wafer contacts a contact part of a corresponding process tool such as a backside fixture, the contact part may easily form an imprint on the backside of the wafer. The imprint will cause ring-shaped polysilicon residues to be formed on the wafer backside, that is, the backside of the wafer, affecting the photolithography process on the crystal face and causing defocus.

The existing method for detecting a wafer backside defect is to form a photo by optical scanning, and analyze the optical signals on the photo to form a two-dimensional defect distribution map. The existing method cannot analyze the height distribution of defects. The height distribution of defects is of vital importance to determining the source of defects.

BRIEF SUMMARY

The technical problem to be solved by the present disclosure is to provide a method for detecting a wafer backside defect, which can test the height or depth of the wafer backside defect and thereby form a 3D distribution map of the wafer backside defect.

In order to solve the above technical problems, the method for detecting a wafer backside defect provided by the present disclosure comprises the following steps:

Step 1, providing a signal database, the signal database comprising signal data corresponding to various different defects, the defects comprising convex defects of various different heights or widths and concave defects of various different depths or widths, the signal data being data formed by transforming emitted and scattered light signals collected after an oblique incident light source is irradiated to the corresponding defect, each type of the defects corresponding to one type of the signal data, the signal data reflecting 3D information of the corresponding defect, and the 3D information of the defects comprising height or depth information.

Step 2, performing backside scanning on a tested wafer by using oblique incident light, and collecting corresponding emitted and scattered light data.

Step 3, comparing the emitted and scattered light data collected in Step 2 with the signal data in the signal database of Step 1, and fitting a defect 3D distribution map of the backside of the tested wafer, the defect 3D distribution map comprising height or depth information corresponding to the wafer backside defect.

A further improvement is that when first wafer backside defect detection is performed, a step of establishing the signal database is required to be performed in Step 1.

After the signal database is established, the subsequent wafer backside defect detection directly uses the signal database established for the first wafer backside defect detection.

Alternatively, the subsequent wafer backside defect detection can update the signal database established for the first wafer backside defect detection.

A further improvement is that establishing the signal database comprises the following sub-steps:

Step 11, providing a plurality of different test patterns each corresponding to a convex defect of one height or width or a concave defect of one depth or width.

Step 12, using the oblique incident light source to irradiate each of the test patterns separately, and collecting reflected and scattered light signals corresponding to the each of the test patterns.

Step 13, converting the collected reflected and scattered light signals into signal data corresponding to the defect and forming the signal database.

A further improvement is that in Step 11, the test patterns are designed in two major categories, each of the test patterns of the first major category corresponds to convex defects of different heights or widths; and each of the test patterns of the second major category corresponds to concave defects of different depths or widths.

A further improvement is that in Step 12, the reflected and scattered light signals of each of the test patterns of the two major categories are collected separately, and after the reflected and scattered light signals of the corresponding test patterns are collected, Step 13 is performed to obtain signal data corresponding to the defect and add the signal data to the signal database.

A further improvement is that in Step 12, an incident end of the oblique incident light source is located on a first side of the corresponding test pattern, and a receiving end for the reflected and scattered light signals is located on a second side of the test pattern and is located on a path of the reflected and scattered light.

A further improvement is that each of the test patterns is provided on a corresponding test wafer.

A further improvement is that the test wafer is a silicon wafer, and the convex defect is composed of an oxide layer convex pattern formed on a surface of the test wafer.

A further improvement is that on the test wafer, each of the convex defects is arranged in a straight line, and an arrangement mode on the same straight line is as follows:

When the width is the same, the convex defects are arranged in order from low height to high height.

When the height is the same, the convex defects are arranged in order from small width to large width.

A further improvement is that the concave defect is composed of a silicon recess formed in the test wafer.

A further improvement is that on the test wafer, each of the concave defects is arranged in a straight line, and an arrangement mode on the same straight line is as follows:

When the width is the same, the concave defects are arranged in order from low depth to high depth.

When the depth is the same, the concave defects are arranged in order from small width to large width.

A further improvement is that the concave defects and the convex defects are arranged on the same test wafer at the same time.

Each of the convex defects is arranged in a straight line, and an arrangement mode on the same straight line is as follows: when the width is the same, the convex defects are arranged in order from low height to high height; and when the height is the same, the convex defects are arranged in order from small width to large width.

Each of the concave defects is arranged in a straight line, and an arrangement mode on the same straight line is as follows: when the width is the same, the concave defects are arranged in order from low depth to high depth; and when the depth is the same, the concave defects are arranged in order from width small width to large width.

A further improvement is that the tested wafer in Step 2 is a silicon wafer.

A further improvement is that after Step 3 is completed, the method further comprises a step of:

determining a source of the wafer backside defect according to the height or depth of the wafer backside defect in the defect 3D distribution map.

A further improvement is that the source of the wafer backside defect comprises a pattern residue generated by a trace formed due to contact between the tested wafer and a contact part of a process tool.

In the present disclosure, a signal database comprising signal data corresponding to various different defects is provided in advance, the signal data is data formed by transforming emitted and scattered light signals collected after an oblique incident light source is irradiated to the corresponding defect, and the signal data reflects 3D information of the corresponding defect comprising height or depth information; then backside scanning is performed on a test wafer by using oblique incident light, and corresponding emitted and scattered light data is collected; and afterwards, the emitted and scattered light data is compared with the signal data in the signal database to fit a defect 3D distribution map of the backside of the tested wafer, the defect 3D distribution map comprises height or depth information corresponding to the wafer backside defect. In this way, the present disclosure can test the height or depth of a wafer backside defect and thus form a 3D distribution map of the wafer backside defect, the 3D information of the wafer backside defect, especially the height or depth information, is helpful to analyze the source of the wafer backside defect, so as to find the source of the defect in time through detection and process it in time, reducing the troubleshooting time of the process tool and providing good protection for wafer products to improve the product yield.

BRIEF DESCRIPTION OF THE DRAWINGS

The present disclosure is described in further detail below with reference to the drawings and specific implementations.

DETAILED DESCRIPTION

Figure 1:
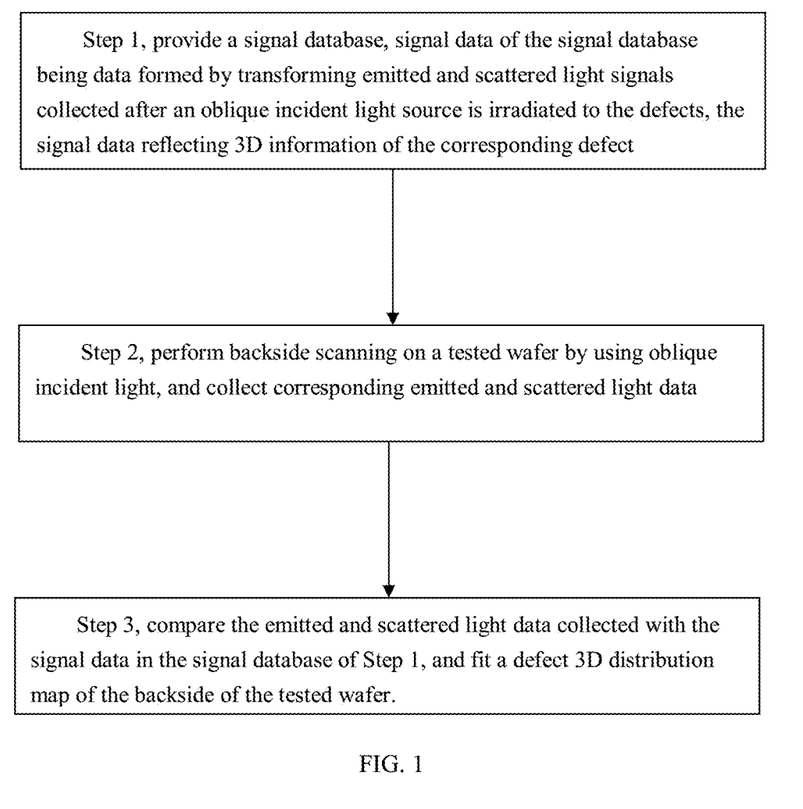
FIG. 1 is a flowchart of a method for detecting a wafer backside defect according to an embodiment of the present disclosure.
Figure 2A:
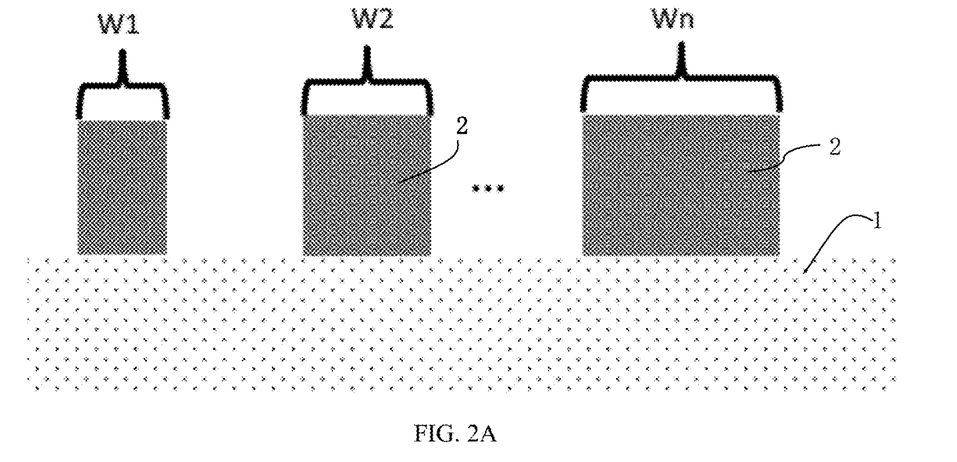
FIG. 2A is a distribution structure diagram of a first type of test pattern according to an embodiment of the present disclosure.
Figure 2B:
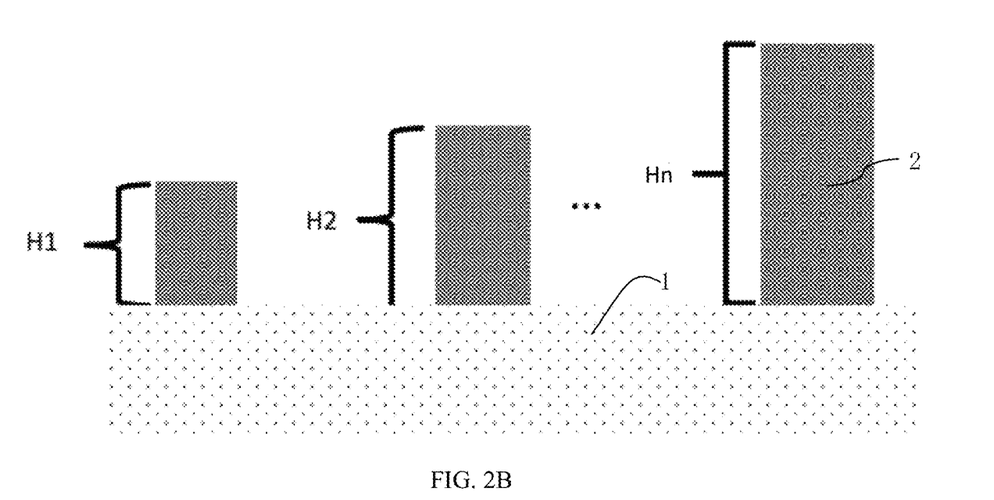
FIG. 2B is a distribution structure diagram of a second type of test pattern according to an embodiment of the present disclosure.
Figure 2C:
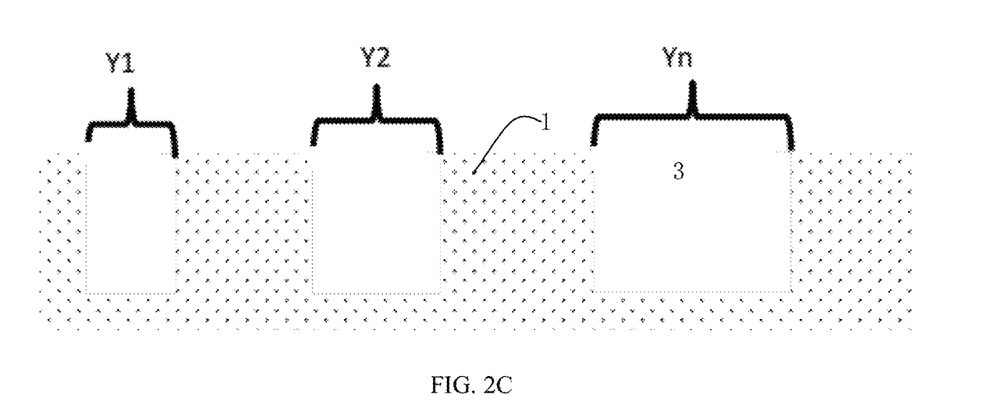
FIG. 2C is a distribution structure diagram of a third type of test pattern according to an embodiment of the present disclosure.
Figure 2D:
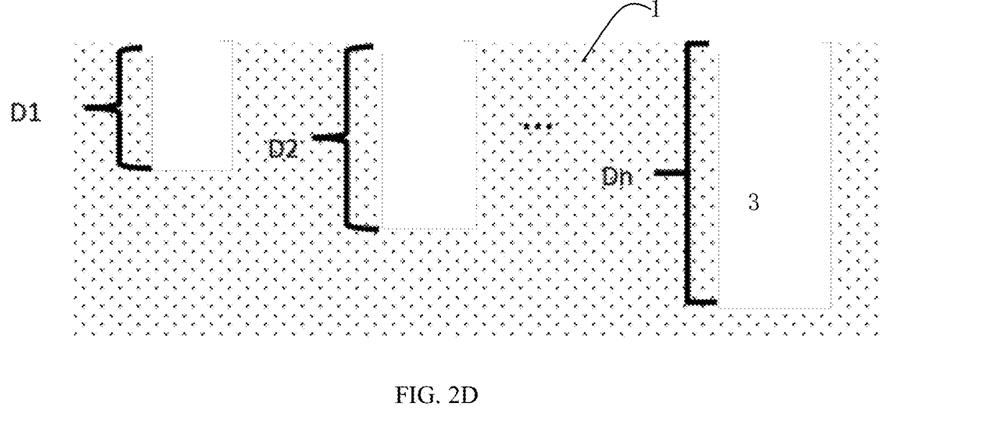
FIG. 2D is a distribution structure diagram of a fourth type of test pattern according to an embodiment of the present disclosure.

As shown in FIG. 1, it is a flowchart of a method for detecting a wafer backside defect according to an embodiment of the present disclosure. As shown in FIG. 2A, it is a distribution structure diagram of a first type of test pattern according to an embodiment of the present disclosure. As shown in FIG. 2B, it is a distribution structure diagram of a second type of test pattern according to an embodiment of the present disclosure. As shown in FIG. 2C, it is a distribution structure diagram of a third type of test pattern according to an embodiment of the present disclosure. As shown in FIG. 2D, it is a distribution structure diagram of a fourth type of test pattern according to an embodiment of the present disclosure. The method for detecting a wafer backside defect according to an embodiment of the present disclosure comprises the following steps:

Step 1, providing a signal database, the signal database comprising signal data corresponding to various different defects, the defects comprising convex defects 2 of various different heights or widths and concave defects 3 of various different depths or widths, the signal data being data formed by transforming emitted and scattered light signals collected after an oblique incident light source is irradiated to the corresponding defect, each type of the defect corresponding to one type of the signal data, the signal data reflecting 3D information of the corresponding defect, and the 3D information of the defect comprising height or depth information.

In an embodiment of the present disclosure, when first wafer backside defect detection is performed, a step of establishing the signal database is required to be performed in Step 1. After the signal database is established, the subsequent wafer backside defect detection directly uses the signal database established for the first wafer backside defect detection. Alternatively, the subsequent wafer backside defect detection can update the signal database established for the first wafer backside defect detection.

Establishing the signal database comprises the following sub-steps:

Step 11, providing a plurality of different test patterns each corresponding to a convex defect 2 of one height or width or a concave defect 3 of one depth or width.

The test patterns are designed in two major categories, each of the test patterns of the first major category corresponds to convex defects 2 of different heights or widths; and each of the test patterns of the second major category corresponds to concave defects 3 of different depths or widths.

Each of the test patterns is provided on a corresponding test wafer 1. The test wafer 1 is a silicon wafer, and the convex defect 2 is composed of an oxide layer convex pattern formed on a surface of the test wafer 1.

On the test wafer 1, each of the convex defects 2 is arranged in a straight line, and an arrangement mode on the same straight line is as follows:

When the height is the same, the convex defects 2 are arranged in order from small width to large width. As shown in FIG. 2A, it is a distribution structure diagram of a first type of test pattern according to an embodiment of the present disclosure. In a distribution structure of the first type of test pattern, the convex defects 2 formed on the test wafer 1 are included. The convex defects 2 have the same heights and different widths. The widths W1, W2 to Wn in FIG. 2A are successively increased.

When the width is the same, the convex defects 2 are arranged in order from low height to high height. As shown in FIG. 2B, it is a distribution structure diagram of a second type of test pattern according to an embodiment of the present disclosure. In a distribution structure of the second type of test pattern, the convex defects 2 formed on the test wafer 1 are included. The convex defects 2 have the same widths and different heights. The heights H1, H2 to Hn in FIG. 2B are successively increased.

The concave defect 3 is composed of a silicon recess formed in the test wafer 1.

On the test wafer 1, each of the concave defects 3 is arranged in a straight line, and an arrangement mode on the same straight line is as follows:

When the depth is the same, the concave defects 3 are arranged in order from low width to high width. As shown in FIG. 2C, it is a distribution structure diagram of a third type of test pattern according to an embodiment of the present disclosure. In a distribution structure of the third type of test pattern, the concave defects 3 formed on the test wafer 1 are included. The concave defects 3 have the same depths and different widths. The widths Y1, Y2, to Yn in FIG. 2C are successively increased.

When the width is the same, the concave defects 3 are arranged in order from small height to large height. As shown in FIG. 2D, it is a distribution structure diagram of a fourth type of test pattern according to an embodiment of the present disclosure. In a distribution structure of the fourth type of test pattern, the concave defects 3 formed on the test wafer 1 are included. The concave defects 3 have the same widths and different depths. The widths D1, D2 to Dn in FIG. 2D are successively increased.

In an embodiment of the present disclosure, the concave defects 3 and the convex defects 2 are arranged on the same test wafer 1 at the same time. In other embodiments, the concave defects 3 or the convex defects 2 of different types can also be formed on different test wafers 1. Alternatively, when the signal database established for the first wafer backside defect detection is updated in the subsequent wafer backside defect detection process, only the concave defects 3 or the convex defects 2 requiring to be supplemented are provided on the test wafer 1.

Figure 4:
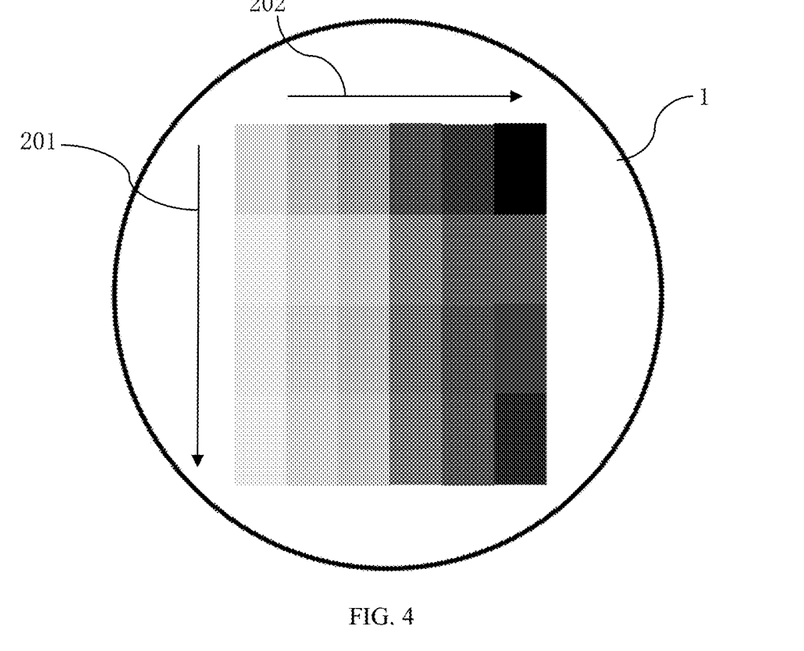
FIG. 4 is a distribution diagram of test patterns obtained on a test wafer in an embodiment of the present disclosure.

As shown in FIG. 4, it is a distribution map of test patterns on a test wafer in an embodiment of the present disclosure. It can be seen that:

Each of the convex defects 2 is arranged in a straight line, and an arrangement mode on the same straight line is as follows: when the width is the same, the convex defects 2 are arranged in order from low height to high height, as shown by an arrow line 202 in FIG. 4, it indicates a direction in which the height of the convex defect 2 increases gradually; and when the height is the same, the convex defects 2 are arranged in order from small width to large width.

Each of the concave defects 3 is arranged in a straight line, and an arrangement mode on the same straight line is as follows: when the width is the same, the concave defects 3 are arranged in order from low depth to high depth, as shown by an arrow line 201 in FIG. 4, it indicates a direction in which the depth of the concave defect 3 increases gradually; and when the depth is the same, the concave defects 3 are arranged in order from small width to large width.

Step 12, using the oblique incident light source to irradiate each of the test patterns separately, and collecting reflected and scattered light signals corresponding to the each of the test patterns.

In an embodiment of the present disclosure, the reflected and scattered light signals of each of the test patterns of the two major categories are collected separately, and after the reflected and scattered light signals of the corresponding test patterns are collected, Step 13 is performed to obtain signal data corresponding to the defect and add the signal data to the signal database. For example:

First the reflected and scattered light signals of the convex defects 2 are collected, and signal data of the corresponding defects is obtained and added to the signal database, then the reflected and scattered light signals of the concave defects 3 are collected, and signal data of the corresponding defects is obtained and added to the signal database.

Alternatively, first the reflected and scattered light signals of the concave defects 3 are collected, and signal data of the corresponding defects is obtained and added to the signal database, then the reflected and scattered light signals of the convex defects 2 are collected, and signal data of the corresponding defects is obtained and added to the signal database.

In other embodiments, scanning can also be performed sequentially according to the position of each of the test patterns on the test wafer to collect reflected and scattered light signals, and the signals are sequentially converted into signal data of the corresponding defect to add to the signal database.

In step 12, an incident end of the oblique incident light source is located on a first side of the corresponding test pattern, and a receiving end for the reflected and scattered light signals is located on a second side of the test pattern and is located on a path of the reflected and scattered light.

Figure 3A:
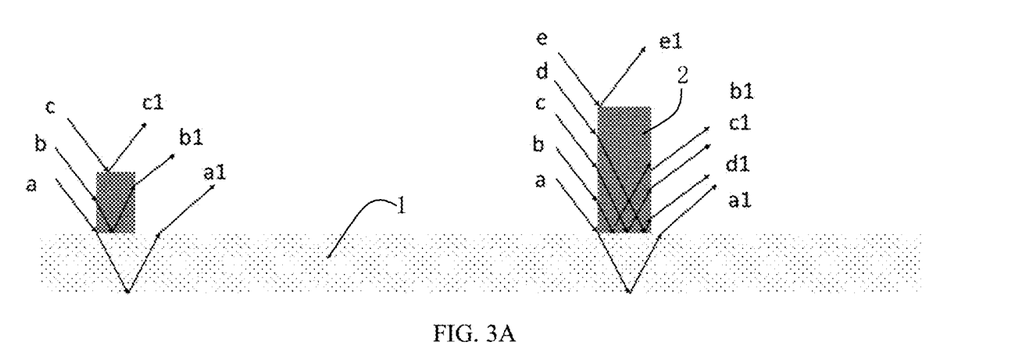
FIG. 3A is a schematic diagram of collecting reflected and scattered light signals corresponding to a test pattern of a convex defect in an embodiment of the present disclosure.

As shown in FIG. 3A, it is a schematic diagram of collecting reflected and scattered light signals corresponding to a test pattern of a convex defect in an embodiment of the present disclosure. FIG. 3A shows two convex defects of different heights. The oblique incident light source at the incident end of the first convex defect 2 is represented by a, b, and c, respectively, and the total amount of incident light is a+b+c; the reflected and scattered light signals at the receiving end are represented by a1, b1, and c1, respectively, and the total amount of received light is a1+b1+c1. Similarly, the total amount of incident light of the second higher convex defect 2 is a+b+c+d+e, and the total amount of received light is a1+b1+c1+d1+e1. It can be seen that the total amounts of received light of the convex defects 2 of different heights are not the same, so the height of the convex defect 2 can be obtained by the total amount of received light of the convex defect 2.

Figure 3B:
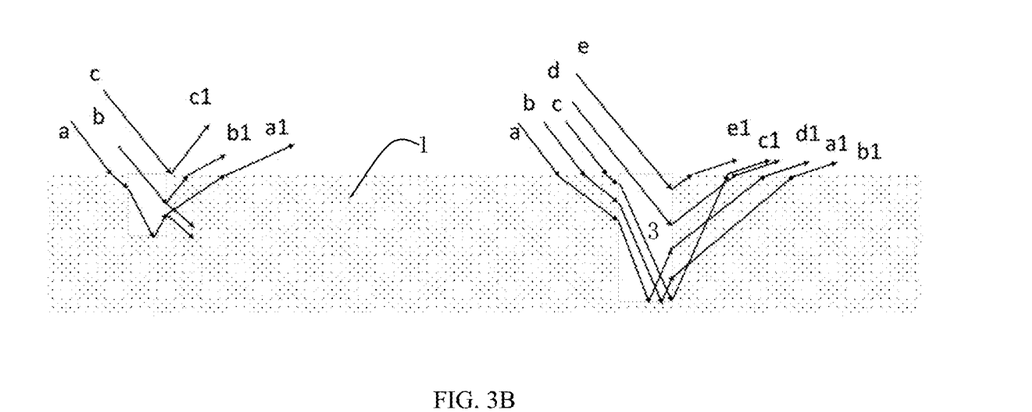
FIG. 3B is a schematic diagram of collecting reflected and scattered light signals corresponding to a test pattern of a concave defect in an embodiment of the present disclosure.

As shown in FIG. 3B, it is a schematic diagram of collecting reflected and scattered light signals corresponding to a test pattern of a concave defect in an embodiment of the present disclosure. FIG. 3B shows two concave defects of different depths. The oblique incident light source at the incident end of the first concave defect 3 is represented by a, b, and c, respectively, and the total amount of incident light is a+b+c; the reflected and scattered light signals at the receiving end are represented by a1, b1, and c1, respectively, and the total amount of received light is a1+b1+c1. Similarly, the total amount of incident light of the second deeper concave defect 3 is a+b+c+d+e, and the total amount of received light is a1+b1+c1+d1+e1. It can be seen that the total amounts of received light of the concave defects 3 of different heights are not the same, so the height of the concave defect 3 can be obtained by the total amount of received light of the concave defect 3.

Step 13, converting the collected reflected and scattered light signals into signal data corresponding to the defect and forming the signal database.

Step 13 can perform signal data conversion of the defect when the reflected and scattered light signals corresponding to each defect are received in Step 12, and add the converted signal data to the signal database. In other embodiments, it also can be implemented as follows: after the reflected and scattered light signals corresponding to all of the defects are collected, the signal data conversion of the defects and the addition of the converted signal data to the signal database are performed separately.

Step 2, performing backside scanning on a tested wafer by using oblique incident light, and collecting corresponding emitted and scattered light data.

The test wafer is a silicon wafer. A product is formed on the tested wafer.

Step 3, comparing the emitted and scattered light data collected in Step 2 with the signal data in the signal database of Step 1, and fitting a defect 3D distribution map of the backside of the tested wafer, the defect 3D distribution map comprising height or depth information corresponding to the wafer backside defect.

Figure 5:
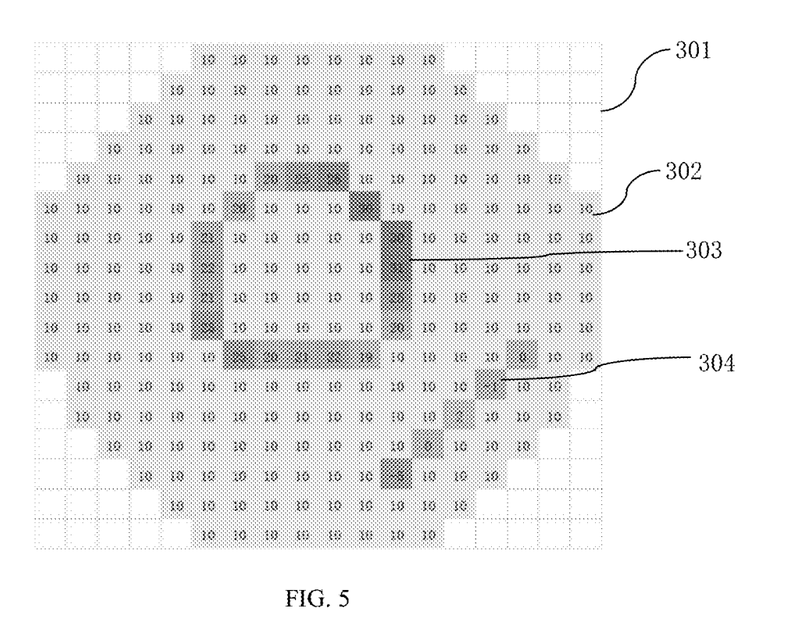
FIG. 5 is a distribution diagram of emitted and scattered light data of the backside of the tested wafer collected according to an embodiment of the present disclosure.

As shown in FIG. 5, it is a distribution diagram of the emitted and scattered light data on the backside of the tested wafer collected according to an embodiment of the present disclosure. A mark 301 represents the entire distribution map. The distribution diagram 301 comprises the tested emitted and scattered light data. The data corresponding to a mark 302 is 10. It can be seen from the comparison with the signal database that there is no defect in the area corresponding to the mark 302. Similarly, the values of various data corresponding to a mark 303 are relatively large. It can be seen from the comparison with the signal database that the area corresponding to the mark 303 comprises convex defects. Similarly, the values of various data corresponding to the mark 304 are relatively small. It can be seen from the comparison with the signal database that the area corresponding to the mark 304 comprises concave defects.

By comparing the emitted and scattered light data in FIG. 5 with the signal data of the signal database, the defects at each coordinate and the height or depth information corresponding to the defects can be obtained, so that a defect 3D distribution map can be obtained.

After Step 3 is completed, the method further comprises a step of:

Determining a source of the wafer backside defect according to the height or depth of the wafer backside defect in the defect 3D distribution map.

The source of the wafer backside defect comprises a pattern residue generated by a trace formed due to contact between the tested wafer and a contact part of a process tool.

With the embodiment of the present disclosure, a signal database comprising signal data corresponding to various different defects is provided in advance, the signal data is data formed by transforming emitted and scattered light signals collected after an oblique incident light source is irradiated to the corresponding defect, and the signal data reflects 3D information of the corresponding defect comprising height or depth information; then backside scanning is performed on a test wafer by using oblique incident light, and corresponding emitted and scattered light data is collected; and afterwards, the emitted and scattered light data is compared with the signal data in the signal database to fit a defect 3D distribution map of the backside of the tested wafer, the defect 3D distribution map comprises height or depth information corresponding to the wafer backside defect. In this way, the embodiment of the present disclosure can test the height or depth of a wafer backside defect and thus form a 3D distribution map of the wafer backside defect, the 3D information of the wafer backside defect, especially the height or depth information, is helpful to analyze the source of the wafer backside defect, so as to find the source of the defect in time through detection and process it in time, reducing the troubleshooting time of the process tool and providing good protection for wafer products to improve the product yield.

The present disclosure has been described in detail through specific embodiments, but these do not constitute a limitation on the present disclosure. Many variations and improvements can be made by those skilled in the art without departing from the principle of the present disclosure, which should also be regarded as the protection scope of the present disclosure.

What is claimed is:

1. A method for detecting a wafer backside defect, comprising the following steps:
    Step 1, providing a signal database, the signal database comprising signal data corresponding to various different defects, the defects comprising convex defects of various different heights or widths and concave defects of various different depths or widths, the signal data being data formed by transforming reflected and scattered light signals collected after an oblique incident light source is irradiated to the defects, each type of the defects corresponding to one type of the signal data, the signal data reflecting 3D information of corresponding defects, and the 3D information of the defects comprising height or depth information, and
    establishing the signal database, the establishing the signal database comprising the following sub-steps:
        Step 11, providing a plurality of different test patterns each corresponding to a convex defect of one height or width or a concave defect of one depth or width;
        Step 12, using the oblique incident light source to irradiate each of the different test patterns separately, and collecting reflected and scattered light signals corresponding to the each of the different test patterns; and Step 13, converting the collected reflected and scattered light signals into signal data corresponding to a defect and forming the signal database;

Step 2, performing backside scanning on a tested wafer by using oblique incident light, and collecting corresponding reflected and scattered light data; and Step 3, comparing the reflected and scattered light data collected in Step 2 with the signal data in the signal database, and fitting a defect 3D distribution map of the backside of the tested wafer, the defect 3D distribution map comprising height or depth information corresponding to the wafer backside defect.

2. The method for detecting the wafer backside defect according to claim 1, wherein when first wafer backside defect detection is performed, the establishing the signal database is required to be performed in Step 1;

after the signal database is established, subsequent wafer backside defect detection directly uses the signal database established for the first wafer backside defect detection;

alternatively, the subsequent wafer backside defect detection can update the signal database established for the first wafer backside defect detection.

3. The method for detecting the wafer backside defect according to claim 1, wherein in Step 11, the different test patterns are designed in two major categories, each of the different test patterns of a first major category corresponds to convex defects of different heights or widths; and each of the different test patterns of a second major category corresponds to concave defects of different depths or widths.

4. The method for detecting the wafer backside defect according to claim 3, wherein in Step 12, the reflected and scattered light signals of each of the different test patterns of the two major categories are collected separately, and after the reflected and scattered light signals of corresponding different test patterns are collected, Step 13 is performed to obtain signal data corresponding to the defect and to add the signal data to the signal database.

5. The method for detecting the wafer backside defect according to claim 1, wherein in Step 12, an incident end of the oblique incident light source is located on a first side of a corresponding different test pattern, and a receiving end for the reflected and scattered light signals is located on a second side of the corresponding different test pattern and is located on a path of the reflected and scattered light.

6. The method for detecting the wafer backside defect according to claim 1, wherein each of the different test patterns is provided on a corresponding test wafer.

7. The method for detecting the wafer backside defect according to claim 6, wherein the test wafer is a silicon wafer, and the convex defect is composed of an oxide layer convex pattern formed on a surface of the test wafer.

8. The method for detecting the wafer backside defect according to claim 7, wherein on the test wafer, each of the convex defects is arranged in a straight line, and an arrangement mode on the same straight line is as follows:

when the width is the same, the convex defects are arranged in order from low height to high height; and when the height is the same, the convex defects are arranged in order from small width to large width.

9. The method for detecting the wafer backside defect according to claim 7, wherein the concave defect is composed of a silicon recess formed in the test wafer.

10. The method for detecting the wafer backside defect according to claim 9, wherein on the test wafer, each of the concave defects is arranged in a straight line, and an arrangement mode on the same straight line is as follows:

when the width is the same, the concave defects are arranged in order from low depth to high depth; and when the depth is the same, the concave defects are arranged in order from small width to large width.

11. The method for detecting the wafer backside defect according to claim 9, wherein the concave defects and the convex defects are arranged on the same test wafer at the same time;

each of the convex defects is arranged in a straight line, and an arrangement mode on the same straight line is as follows: when the width is the same, the convex defects are arranged in order from low height to high height; and when the height is the same, the convex defects are arranged in order from small width to large width; and each of the concave defects is arranged in a straight line, and an arrangement mode on the same straight line is as follows: when the width is the same, the concave defects are arranged in order from low depth to high depth; and when the depth is the same, the concave defects are arranged in order from width small width to large width.

12. The method for detecting the wafer backside defect according to claim 1, wherein the tested wafer in Step 2 is a silicon wafer.

13. The method for detecting the wafer backside defect according to claim 1, wherein after Step 3 is completed, the method further comprises a step of:

determining a source of the wafer backside defect according to the height or depth of the wafer backside defect in the defect 3D distribution map.

14. The method for detecting the wafer backside defect according to claim 13, wherein the source of the wafer backside defect comprises a pattern residue generated by a trace formed due to contact between the tested wafer and a contact part of a process tool.

* * * * *